(12) United States Patent
Wong et al.

(10) Patent No.: US 10,070,463 B2
(45) Date of Patent: Sep. 4, 2018

(54) WIRELESS TELECOMMUNICATIONS

(71) Applicant: Alcatel Lucent, Boulogne Billancourt (FR)

(72) Inventors: Shin Horng Wong, Swindon (GB); Matthew Baker, Swindon (GB); Min Zhang, Swindon (GB)

(73) Assignee: Alcatel Lucent, Boulogne Billancourt (FR)

( * ) Notice: Subject to any disclaimer, the term of this patent is extended or adjusted under 35 U.S.C. 154(b) by 33 days.

(21) Appl. No.: 14/763,711

(22) PCT Filed: Dec. 19, 2013

(86) PCT No.: PCT/EP2013/003849
§ 371 (c)(1),
(2) Date: Jul. 27, 2015

(87) PCT Pub. No.: WO2014/114318
PCT Pub. Date: Jul. 31, 2014

(65) Prior Publication Data
US 2015/0359005 A1 Dec. 10, 2015

(30) Foreign Application Priority Data
Jan. 28, 2013 (EP) ..................................... 13305094

(51) Int. Cl.
*H04W 4/00* (2018.01)
*H04W 74/08* (2009.01)
(Continued)

(52) U.S. Cl.
CPC ....... *H04W 74/0833* (2013.01); *H04W 76/18* (2018.02); *H04W 74/006* (2013.01)

(58) Field of Classification Search
None
See application file for complete search history.

(56) References Cited

U.S. PATENT DOCUMENTS 8,199,778 B2 6/2012 Shimomura et al.
8,964,649 B2 2/2015 Jami et al.
(Continued)

FOREIGN PATENT DOCUMENTS

CN 101569231 10/2009
CN 102665225 9/2012
(Continued)

OTHER PUBLICATIONS

International Search Report for PCT/EP2013/003849 dated Feb. 4, 2014.
(Continued)

*Primary Examiner* — Rebecca E Song
(74) *Attorney, Agent, or Firm* — Fay Sharpe LLP

(57) ABSTRACT

A wireless telecommunications method, a computer program product and network nodes are disclosed. The wireless telecommunications network node method comprises on a failure to establish a connection after initiating a RACH procedure, repeatedly transmitting a RACH preamble signature using a defined set of resource blocks of an uplink channel. In this way, when a conventional RACH procedure fails to establish a connection with the network, a modified RACH procedure is instead initiated. This modified RACH procedure transmits a RACH preamble signature repeatedly using a repeating set of resource blocks which are repeatedly allocated from the uplink channel. This enables the RACH preamble signature to be repeatedly transmitted so that the energy from these repeated transmissions may be combined by the network in order to detect the presence of the RACH preamble signature transmitted by network nodes in a poor coverage area such as, for example, an MTC device located in a basement.

22 Claims, 1 Drawing Sheet

(51) Int. Cl.
*H04W 76/18* (2018.01)
*H04W 74/00* (2009.01)

(56) References Cited

U.S. PATENT DOCUMENTS

| | | | | |
|---|---|---|---|---|
| 2007/0178940 A1* | 8/2007 | Hara | .................... | H04W 16/30 |
| | | | | 455/561 |
| 2007/0248046 A1* | 10/2007 | Khan | .................... | H04W 72/04 |
| | | | | 370/329 |
| 2009/0191875 A1* | 7/2009 | Vujcic | ................. | H04W 74/004 |
| | | | | 455/436 |
| 2009/0305693 A1 | 12/2009 | Shimomura et al. | | |
| 2010/0296467 A1* | 11/2010 | Pelletier | .............. | H04W 74/002 |
| | | | | 370/329 |
| 2013/0183987 A1* | 7/2013 | Vrzic | .................... | H04L 1/0046 |
| | | | | 455/450 |

FOREIGN PATENT DOCUMENTS

| | | |
|---|---|---|
| EP | 1 758 415 A1 | 2/2007 |
| EP | 2 101 509 A1 | 9/2009 |
| WO | WO 2008/081531 | 7/2008 |
| WO | WO 2008/115247 A1 | 9/2008 |
| WO | WO 2008/156321 A2 | 12/2008 |
| WO | WO 2009/093861 A1 | 7/2009 |
| WO | WO 2012/131153 A1 | 10/2012 |

OTHER PUBLICATIONS

Alcatel-Lucent, et al., "Feasibility of coverage extension of physical channels for MTC devices", R1-130462, 3GPP TSG-RAN WG1#72, St. Julian's, Malta, Jan. 28-Feb. 1, 2013.

* cited by examiner

WIRELESS TELECOMMUNICATIONS

FIELD OF THE INVENTION

The present invention relates to a wireless telecommunications method, a computer program product and network nodes.

BACKGROUND

Wireless telecommunications systems are known. In a cellular system, radio coverage is provided to user equipment, for example, mobile phones, by areas known as cells. A base station is located in each cell to provide the radio coverage. User equipment in each cell receives information and data from the base station and transmits information and data to the base station.

Information and data transmitted by the base station to the user equipment occurs on channels of radio carriers known as downlink channels. Information and data transmitted by user equipment to the base station occurs on channels of radio carriers known as uplink channels. Although the deployment of base stations is largely controllable by the network operator, the deployment of user equipment is not. The deployment of user equipment within the network can cause unexpected consequences.

Accordingly, it is desired to provide an improved technique for communicating between a base station and user equipment.

SUMMARY

According to a first aspect, there is provided a wireless telecommunications network node method comprising: on a failure to establish a connection after initiating a RACH procedure, repeatedly transmitting a RACH preamble signature using a defined set of resource blocks of an uplink channel.

The first aspect recognises that an increasing problem with the deployment of user equipment is that they can be deployed in areas suffering from high attenuation. This high attenuation can cause the user equipment to be unable to decode configuration information, which is essential for being able to access appropriate traffic. This means that when deployed in these areas of high attenuation, the user equipment is effectively unable to send or receive traffic from the base station. The first aspect also recognises that existing standards fail to provide an adequate technique for proving this configuration information in high attenuation deployments, which means that user equipment implementing those standards are unable to communicate with the network during such deployment. The first aspect further recognises that whilst this is inconvenient for some user equipment when located in these high attenuation areas, coverage is restored when the user equipment moves to a lower attenuation area but that there is an emerging class of user equipment (such as machine type communication device such as, for example, smart meters) which are immobile once installed; for those user equipment no network coverage is provided.

Accordingly, a wireless telecommunications network node method is provided. The method may comprise the step of, when an initiated random access channel RACH procedure fails to establish a connection, a RACH preamble signature is repeated periodically using a defined or pre-allocated set of resource blocks of an uplink channel. In this way, when a conventional RACH procedure fails to establish a connection with the network, a modified RACH procedure is instead initiated. This modified RACH procedure transmits a RACH preamble signature repeatedly using a set of resource blocks which are repeatedly allocated from the uplink channel. This enables the RACH preamble signature to be repeatedly transmitted so that the energy from these repeated transmissions may be combined by the network in order to detect the presence of the RACH preamble signature transmitted by network nodes in a poor coverage area such as, for example, an MTC device located in a basement.

In one embodiment, the step of repeatedly transmitting comprises repeatedly transmitting an identical RACH preamble signature using a periodically repeating defined set of resource blocks of the uplink channel. Accordingly, the same RACH preamble signature may be repeatedly transmitted using the allocated resources. This repeated transmission of the same RACH preamble signature facilitates the detection of that signature within the combined transmissions.

In one embodiment, the periodically repeating defined set of resource blocks comprises a periodically repeating group of resource blocks within a periodically repeating selection of subframes of the uplink channel. Accordingly, groups of resource blocks may be allocated within sub-frames and the same repeating allocation of resource blocks within sub-frames may occur during each periodic repetition of the defined set.

In one embodiment, the step of repeatedly transmitting comprises repeatedly transmitting the identical RACH preamble signature in each periodically repeating group of resource blocks within the periodically repeating selection of subframes.

Accordingly, each group of resource blocks within the defined set may be used to transmit the RACH preamble signature. That is to say, the RACH preamble signature may be repeated multiple times within the same defined set.

In one embodiment, the identical RACH preamble signature comprises a sequence of RACH preamble signatures and the step of repeatedly transmitting comprises repeatedly transmitting the sequence of RACH preamble signatures using the periodically repeating group of resource blocks within the periodically repeating selection of subframes. Accordingly, the RACH preamble signature may be made up of a sequence of RACH preamble signatures and that sequence may be transmitted by the groups of resource blocks within the defined set.

In one embodiment, the method comprises the step of receiving an indication of a plurality of the periodically repeating defined sets. Accordingly, more than one defined set may be provided, each of which may be utilised for the transmission of a RACH preamble signature.

In one embodiment, each defined set comprises differing selected groups of resource blocks from selected subframes. Having different groups of resource blocks selected from different sub-frames helps to ensure spectral diversity of each defined set.

In one embodiment, each defined set comprises selected groups of resource blocks from selected sub-bands from selected subframes.

In one embodiment, at least one defined set includes at least one non-contiguous group of selected resource blocks from at least one selected sub-frame. By utilising non-contiguous, adjoining or adjacent resource blocks within a group can help to increase the power spectral density of the transmission of the RACH preamble signature.

In one embodiment, the at least one defined set includes at least one non-contiguous group of selected resource blocks at sub-band edges from selected sub-frames. Including resource blocks within the non-contiguous groups which are located at sub-band edges helps to maintain timing synchronisation.

In one embodiment, the method comprises the step of selecting the defined set from the plurality of defined sets randomly. Selecting a defined set randomly helps to prevent transmission collisions between different network nodes.

In one embodiment, the method comprises the step of selecting, as the defined set, one of the plurality of defined sets having resource blocks within each sub-band. By selecting a defined set having resource blocks in each sub-band provides for spectral diversity and may assist in the detection of the RACH preamble signature.

In one embodiment, the method comprises the step of selecting, as the defined set, one of the plurality of defined sets having resource blocks predominantly within a selected sub-band. Accordingly, the defined set may be selected such that a majority of the resource blocks are within a particular sub-band in order to enhance the transmission of the RACH preamble signature within that sub-band.

In one embodiment, the method comprises the step of determining a sub-band of a strongest received pilot and selecting, as the defined set, one of the plurality of defined sets having resource blocks predominantly within the sub-band. Accordingly, that sub-band on which the strongest pilot signal is being received may be selected. This helps to maximise the possibility that the transmissions of the RACH preamble signature on that sub-band are likely to be received by the network.

In one embodiment, the method comprises the step of determining a service requirement for the network node and selecting, as the defined set, one of the plurality of defined sets which has characteristics which matches the service requirement most closely. Accordingly, the characteristics of the defined set may be selected such that they best match the requirements of the network node. Such requirements may be, for example, an access time, a quality of service or a priority. For network nodes having a high service requirement, the density of allocated resource blocks within a defined set would be higher than those of a defined set suitable for a lower service requirement network node.

In one embodiment, the method comprises the step of ceasing to transmit the RACH preamble signature when a random access response message is received. Halting transmission of the preamble signature helps to free resources for use by other network nodes.

In one embodiment, the method comprises the step of preventing initiation of the RACH procedure for a defined period following receipt of the random access response message. Accordingly, should a random access response message be received indicating that the repeating RACH preamble signature of the modified RACH procedure has been correctly received and decoded, then the conventional RACH procedure is bypassed for a period of time since it is unlikely to be able to establish a connection.

In one embodiment, the method comprises receiving a channel with a first format in response to receiving the random access response message in response to a RACH preamble transmission using a first one of said defined sets and receiving a channel with a second format in response to receiving a random access response message in response to a RACH preamble transmission using a second one of said defined sets.

In one embodiment, the method comprises transmitting a channel with a first format in response to receiving the random access response message in response to a RACH preamble transmission using a first one of said defined sets and transmitting a channel with a second format in response to receiving a random access response message in response to a RACH preamble transmission using a second one of said defined sets.

In one embodiment, a plurality of different RACH preamble signatures are defined and the method comprises the step of selecting one of the plurality of different RACH preamble signatures as the RACH preamble signature.

In one embodiment, the one of the plurality of different RACH preamble signatures is selected randomly.

In one embodiment, the RACH procedure and the repeated RACH preamble signature comprise the same RACH preamble signature.

According to a second aspect, there is provided a network node comprising: transmission logic operable, on a failure to establish a connection after initiating a RACH procedure, to repeatedly transmit a RACH preamble signature using a defined set of resource blocks of an uplink channel.

In one embodiment, the transmission logic is operable to repeatedly transmit an identical RACH preamble signature using a periodically repeating defined set of resource blocks of the uplink channel.

In one embodiment, the periodically repeating defined set of resource blocks comprises a periodically repeating group of resource blocks within a periodically repeating selection of subframes of the uplink channel.

In one embodiment, the transmission logic is operable to repeatedly transmit the identical RACH preamble signature in each periodically repeating group of resource blocks within the periodically repeating selection of subframes.

In one embodiment, the identical RACH preamble signature comprises a sequence of RACH preamble signatures and the transmission logic is operable to repeatedly transmit the sequence of RACH preamble signatures using the periodically repeating group of resource blocks within the periodically repeating selection of subframes.

In one embodiment, the network node comprises logic operable to receive an indication of a plurality of the periodically repeating defined sets.

In one embodiment, each defined set comprises differing selected groups of resource blocks from selected subframes.

In one embodiment, each defined set comprises selected groups of resource blocks from selected sub-bands from selected subframes.

In one embodiment, at least one defined set includes at least one non-contiguous group of selected resource blocks from at least one selected sub-frame.

In one embodiment, the at least one defined set includes at least one non-contiguous group of selected resource blocks at sub-band edges from selected sub-frames.

In one embodiment, the transmission logic is operable to select the defined set from the plurality of defined sets randomly.

In one embodiment, the transmission logic is operable to select, as the defined set, one of the plurality of defined sets having resource blocks within each sub-band.

In one embodiment, the transmission logic is operable to select, as the defined set, one of the plurality of defined sets having resource blocks predominantly within a selected sub-band.

In one embodiment, the network node comprises determining logic operable to determine a sub-band of a strongest received pilot and wherein the transmission logic is operable select, as the defined set, one of the plurality of defined sets having resource blocks predominantly within the sub-band.

In one embodiment, the network node comprises determining logic operable to determine a service requirement for the network node and wherein the transmission logic is operable select, as the defined set, one of the plurality of defined sets which has characteristics which matches the service requirement most closely.

In one embodiment, the transmission logic is operable cease transmission of the RACH preamble signature when a random access response message is received.

In one embodiment, the transmission logic is operable to prevent initiation of the RACH procedure for a defined period following receipt of the random access response message.

In one embodiment, the network node comprises logic operable to receive a channel with a first format in response to receiving the random access response message in response to a RACH preamble transmission using a first one of said defined sets and to receive a channel with a second format in response to receiving a random access response message in response to a RACH preamble transmission using a second one of said defined sets.

In one embodiment, the network node comprises logic operable to transmit a channel with a first format in response to receiving the random access response message in response to a RACH preamble transmission using a first one of said defined sets and to transmit a channel with a second format in response to receiving a random access response message in response to a RACH preamble transmission using a second one of said defined sets.

In one embodiment, a plurality of different RACH preamble signatures are defined and wherein the transmission logic is operable select one of the plurality of different RACH preamble signatures as the RACH preamble signature.

In one embodiment, the RACH procedure and the repeated RACH preamble signature comprise the same RACH preamble signature.

According to a third aspect, there is provided a wireless telecommunications network node method, comprising: repeatedly combining transmitted signals received using a defined set of resource blocks of an uplink channel to detect a RACH preamble signature.

In one embodiment, the step of repeatedly combining comprises repeatedly combining signals received using a periodically repeating defined set of resource blocks of the uplink channel to detect an identical, repeating RACH preamble signature.

In one embodiment, the periodically repeating defined set of resource blocks comprises a periodically repeating group of resource blocks within a periodically repeating selection of subframes of the uplink channel.

In one embodiment, the step of repeatedly combining comprises repeatedly combining signals received in each periodically repeating group of resource blocks within the periodically repeating selection of subframes.

In one embodiment, the step of repeatedly combining comprises repeatedly combining signals in each periodically repeating group of resource blocks within the periodically repeating selection of subframes to detect the identical, repeating RACH preamble signature.

In one embodiment, the method comprises transmitting an indication of a plurality of the periodically repeating defined sets.

In one embodiment, the step of repeatedly combining comprises repeatedly combining signals received using each periodically repeating defined set of resource blocks of the uplink channel to detect a RACH preamble signature.

In one embodiment, each defined set comprises differing selected groups of resource blocks from selected subframes.

In one embodiment, each defined set comprises selected groups of resource blocks from selected sub-bands from selected subframes.

In one embodiment, at least one defined set includes at least one non-contiguous group of selected resource blocks from at least one selected sub-frame.

In one embodiment, the at least one defined set includes at least one non-contiguous group of selected resource blocks at sub-band edges from selected sub-frames.

In one embodiment, the method comprises transmitting a random access response message upon detection of the RACH preamble signature.

According to a fourth aspect, there is provided a network node comprising: reception logic operable to combine repeatedly transmitted signals received using a defined set of resource blocks of an uplink channel to detect a RACH preamble signature.

In one embodiment, the reception logic is operable to repeatedly combine signals received using a periodically repeating defined set of resource blocks of the uplink channel to detect an identical, repeating RACH preamble signature.

In one embodiment, the periodically repeating defined set of resource blocks comprises a periodically repeating group of resource blocks within a periodically repeating selection of subframes of the uplink channel.

In one embodiment, the reception logic is operable to repeatedly combine signals received in each periodically repeating group of resource blocks within the periodically repeating selection of subframes.

In one embodiment, the reception logic is operable to repeatedly combine signals in each periodically repeating group of resource blocks within the periodically repeating selection of subframes to detect the identical, repeating RACH preamble signature.

In one embodiment, the network node comprises logic operable to transmit an indication of a plurality of the periodically repeating defined sets.

In one embodiment, the reception logic is operable to combine repeatedly transmitted signals received using each periodically repeating defined set of resource blocks of the uplink channel to detect a RACH preamble signature.

In one embodiment, each defined set comprises differing selected groups of resource blocks from selected subframes.

In one embodiment, each defined set comprises selected groups of resource blocks from selected sub-bands from selected subframes.

In one embodiment, at least one defined set includes at least one non-contiguous group of selected resource blocks from at least one selected sub-frame.

In one embodiment, the at least one defined set includes at least one non-contiguous group of selected resource blocks at sub-band edges from selected sub-frames.

In one embodiment, the network node comprises transmission logic operable to transmit a random access response message upon detection of the RACH preamble signature.

According to a fifth aspect, there is provided a computer program product operable, when executed on a computer, to perform the method steps of the first or third aspects.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
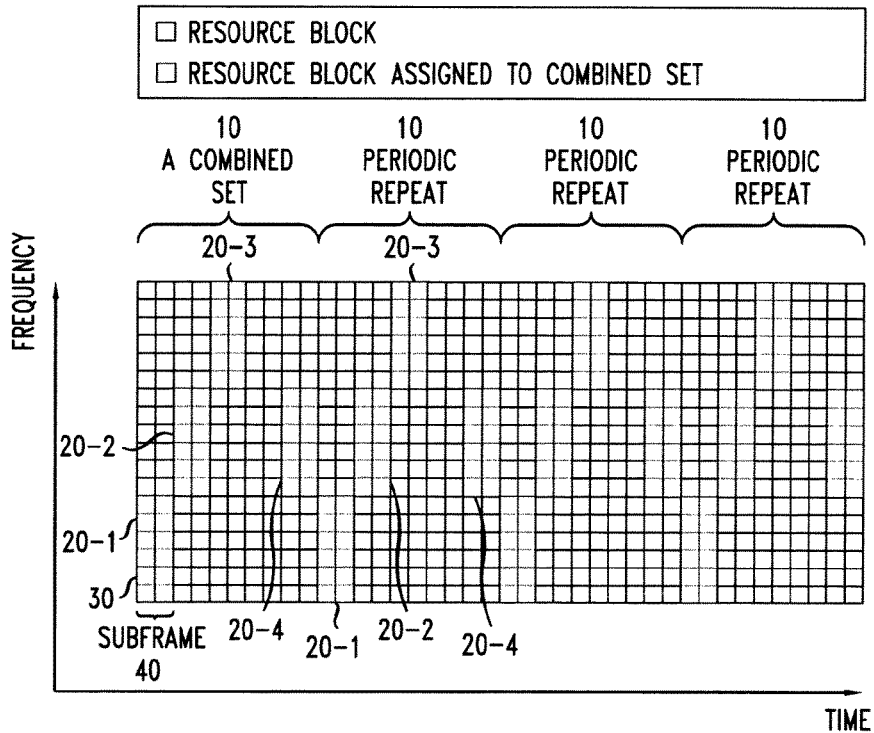
FIG. 1 illustrates an example configuration of resource block for a combining set.

Before discussing the embodiments in any more detail, first an overview will be provided. A Machine Type Communication (MTC) device is user equipment (UE) that is used by a machine for specific application. An example of such MTC device is smart utility meter. As mentioned above, some of these smart meters may be located in basement, which suffer from high penetration loss and therefore it is difficult for the MTC device to communicate with the network. Therefore, it is desired to extend the coverage of these MTC devices by 20 dB.

Repetition is one way of improving the received signal of a message. Here, the receiver accumulates the signal energy of each repeated signal to a point where the signal energy is strong enough such that the message can be demodulated reliably. The message is usually repeated in time and, for large coverage improvements, a large amount of repetitions may be required. For delay tolerant user data, a large amount of repetition spread over a long period of time is feasible.

Embodiments provide a technique whereby resources within, for example, the uplink channel are allocated to different sets. Each defined set comprises a number of resource blocks within sub-frames of the uplink channel. For example, a defined set may comprise resource blocks in each of multiple consecutive sub-frames within the uplink channel. These resource blocks within the defined set may be utilised for the transmission of RACH preamble signatures from the user equipment to the network. Once the transmission of the RACH preamble signature using these resource blocks has been completed across, for example, the multiple sub-frames, this is then repeated in the next following multiple sub-frames until an indication is received that the RACH preamble signature has been correctly detected. The network is also aware of the defined sets and will be combining the energy received from within these resources blocks of the defined sets to try to detect whether a RACH preamble signature can be identified. This combining of repeated transmissions helps to increase the ability to distinguish the RACH preamble signature even when transmitted by user equipment located in a poor coverage area. Embodiments provide multiple different defined sets of groups of resource blocks, each of which may be optimised for different conditions. The user equipment may select one of these defined sets either randomly or based on the conditions that the user equipment is experiencing. The base station will continuously attempt to decode RACH preamble signatures within each of these defined sets and identify when such detection is successful.

Conventional RACH Procedure

In random access, the MTC (or UE) that wishes to access the network transmits a randomly selected RACH preamble signature. If the base station (eNB) fails to detect the RACH transmission, the UE will retry at a higher power with another randomly selected RACH preamble signature. If the MTC is out of coverage, the RACH preamble signature that is transmitted at maximum power will not be detected by the eNB because the eNB is not aware of the failed RACH transmission. Different format RACH signatures are possible. In particular, RACH format 2 and 3 are specified to support medium and large cells. These RACH formats have preamble signatures that are twice as long as those for normal usage (i.e. RACH format 0). Only one such format can be configured since it is designed for the cell size. Using this RACH format for MTC will force legacy users to adopt a long preamble signature even though it is not needed. Accordingly, embodiments seek to provide a technique for increasing the RACH coverage.

RACH Resources

Embodiments provide a technique which defines two types of sets of resources (i.e. resource blocks (RBs) and subframes) for RACH signalling, namely: combining sets of resources and a non-combining set of resources.

Signalling is provided to indicate the resources (typically in time and frequency) of the combining and non-combining set(s) to the UEs.

A combining set contains a set of resources (RBs and subframes) that are used for repeatedly transmitting a RACH preamble signature that can be combined or accumulated in the eNB receiver, i.e. for MTC devices requiring RACH coverage extension. The MTC device typically transmits at least two RACH preamble signatures where each RACH preamble signature is transmitted using the resources defined in a combined set. The first RACH preamble signature is typically selected randomly by the MTC device as per the conventional RACH procedure mentioned above. The subsequent RACH preamble signatures are typically the same as that of the first RACH preamble signature, but may also be randomly selected when transitioning to the combining technique; the same selected RACH preamble signature is then repeated using the combining set resource blocks. A sequence of RACH preamble signatures may be transmitted by the combining set resource blocks and this sequence of RACH preamble signatures is then repeated by each repetition of the combining set resource blocks. The eNB accumulates the signal energy from each of these resources, i.e. combining the RACH preamble signatures repetitions together, to try to detect for a RACH. More than one combining set can be configured and the resources in these combining sets can overlap. The combining sets can be indicated using broadcast or dedicated RRC signalling to the MTC devices. Should user equipment require to use the combining set to establish a connection with the network, then the user equipment may bypass or prevent attempting to establish a subsequent connection with the network using the conventional RACH procedure for a selected or fixed period of time thereafter since it is likely that the conventional RACH procedure will fail once again.

The number of Resource Blocks forming a group (in a subframe) used for the conventional RACH procedure mentioned above is 6. It should be noted that the number of Resource Blocks defined for a single RACH transmission in embodiments can be different to that used for the conventional RACH procedure mentioned above. For example, two groups of 3 Resource Blocks over 2 subframes can be used to send a single RACH transmission, which would result in higher power spectral density (PSD) in the RACH preamble signature and lower noise power in the receiver (since a smaller bandwidth is used). It should also be noted that the Resource Blocks used for a single RACH transmission need not be contiguous in time or frequency. In one embodiment, the reduced number of RBs per subframe with higher PSD forming a group are separated in frequency. For example, one group may comprise only the outer two RBs of a conventional RACH resource; this has the advantage of maintaining the same timing resolution accuracy as a conventional RACH transmission that uses all the RBs (at least if the radio propagation channel is not strongly frequency-selective).

A non-combining set contains resources for the conventional RACH procedure mentioned above. These resources are the same resources used in the for the conventional RACH procedure mentioned above. The resources in the non-combining set can overlap with those in the combining set(s). For example, in one embodiment a combining set may consist of alternate resources of a non-combining set; given that an combining or accumulative RACH transmission will occupy multiple resources, this kind of configuration reduces blocking of the RACH resources (i.e. reduces access delay) for the non-MTC devices compared to the use of a single set of resources for both combining and non-combining RACH. Fully non-overlapping combining and non-combining sets have the advantage of avoiding altogether any increase in access delay for non-MTC devices as a result of a combining RACH transmission from an MTC device, but such a configuration incurs a higher resource overhead.

In an embodiment, the MTC device randomly selects one of the combining sets to transmit its RACH preamble signature. This embodiment recognizes that multiple MTC devices may try to access the network at the same time and hence randomising the selection of the combining sets helps avoid RACH collision.

Combining Set

FIG. 1 illustrates an example configuration of resource block for a combining set. The resource blocks forming the combining set 10 are allocated from the available resource blocks within subframes. In this example, 4 groups of resource blocks 20-1 to 20-4 are allocated to the combining set. Each group 20-1 to 20-4, is formed of 6 resource blocks allocated within a sub-frame. The resource blocks defined for a combining set are typically allocated or repeated periodically, as shown in FIG. 1, where the combining set 10 is defined to span 5 subframes and is periodically repeated in each following 5 subframes.

Signature

In an embodiment, the RACH repetition (i.e. the amount of RACH preamble signature to be transmitted) is independent of the size of the combining set. For example, in FIG. 1, if a RACH preamble signature occupies the allocated resource blocks of one subframe and its repetition is 10, then the RACH preamble signature is repeated over two combining sets.

The RACH preamble signature repetition can be MTC device specific, i.e. different MTC devices in the cell can have different RACH preamble signature repetition factors. On the other hand, if the RACH repetition is less than the size of the combining set, then the RACH repetition can stop prior to the end of a combining set period. It should be noted that the MTC device can also stop its RACH preamble signature repetition once it receives an acknowledgement (i.e. Random Access Response) from the network. For example if the MTC device is configured to perform a maximum of 5 repetitions but it receives a Random Access Response after transmitting 2 repetitions, then it can stop transmitting the rest of the RACH preamble signature transmissions (repetitions).

In another embodiment, the first RACH preamble signature transmission occurs at the beginning of a combining set period. This provides a distinct energy accumulation window for the eNB which may reduce eNB complexity.

As mentioned above, the MTC devices can use a predefined sequence of preamble signatures. There are 64 preamble signatures available, a sequence of preamble signature can be for example, preamble signature 5, 10, 32 and 1. The MTC device transmits each preamble signature in each of the Resource Block in the combining set. For example, in FIG. 1, this MTC device will transmit preamble signature 5 in the 1st subframe, 10 in the 2nd subframe, 32 in the 3rd subframe and 1 in the 5th subframe (there are no resource configured for the 4th subframe of the combining set).

In one embodiment, the MTC device can first perform random access using resources in the non-combining set. If it fails to access the network after reaching a predefined power over a predefined number of attempts, it will use the combining set. This allows MTC device that are closer to the eNB (i.e. not in coverage extension region) to use the legacy resource and only MTC devices that actually needs the coverage extension to use those resources defined for coverage extension.

Example Embodiment

Figure 2:
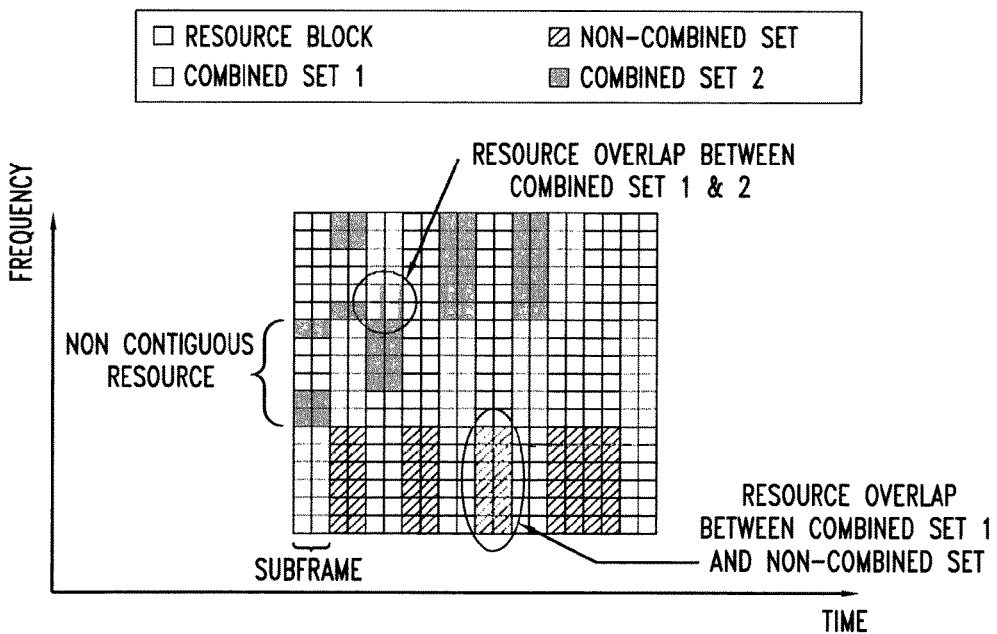
FIG. 2 illustrates an example embodiment which allocates resource blocks for two combining sets.

FIG. 2 illustrates an example embodiment which allocates resource blocks for 2 combining or accumulative sets: combining set 1 and combining set 2 and 1 non-combining set. Combining set 1 has a periodicity of 5 subframes, whilst combining set 2 has a periodicity of 10 subframes. Combining sets 1 and 2 have overlapping resources in the 3rd subframe. The resources in combining set 1 also overlaps with that in of the non-combining set in the 6th subframe. In this example, the resources defined for the 1st subframe of combining set 2 do not occupy 6 Resource Blocks but only 2. This is to illustrate one of the embodiments described in the previous section.

Two MTC devices, MTC1 and MTC2 are located in basements and both wish to access the network. Both devices are configured for 8 RACH preamble signature repetitions. The following are the steps taken by both devices:

1) MTC1 randomly selects combining set 1 for RACH transmissions whilst MTC2 randomly selects combining set 2 for RACH transmissions.
2) MTC1 randomly selects RACH preamble signature 5 whilst MTC2 randomly selects RACH preamble signature 19
3) In subframe 1:
   a. MTC1 transmits RACH preamble signature 5;
   b. MTC2 transmits half of preamble signature 19 (since only half of the resources are available). Here the half of the RACH preamble is transmitted at a higher Power Spectral Density (PSD) than what it would be if it is transmitted using the full 6 Resource Blocks;
   c. The RACH transmission from MTC1 is not detected. The RACH transmission from MTC2 is not complete and hence nothing is detected.

4) In subframe 2:
a. MTC1 performs a repetition of the RACH preamble signature 5;
b. MTC2 transmits the remaining half of the 1st transmission of preamble signature 19;
c. The eNB combines the signal energy from subframe 1 and subframe 2 of combining set 1;
d. The eNB concatenates the signal from subframe 1 and subframe 2 of combining set 2 (knowing that each subframe contains only half of the preamble signature);
e. The eNB fails to detect any RACH transmission.
5) In subframe 3:
a. MTC1 performs a third repetition of preamble signature 5;
b. MTC2 performs a second repetition of preamble signature 19 (the full preamble signature);
c. The eNB combines signal energy from the previous subframes in the combining sets but fails to detect any RACH transmissions.
6) Nothing is transmitted in subframe 4 since no resource is defined for either combining set.
7) In subframe 5:
a. MTC1 transmits its fourth repetition of preamble signature 5;
b. MTC2 transmits its third repetition of preamble signature 19;
c. The eNB combines signal energy but fails to detect any RACH transmissions.
8) In subframe 6:
a. MTC1 transmits its fifth repetition of preamble signature 5;
b. MTC2 does not transmit any preamble signature since no resource is configured in this subframe for combining set 2;
c. The eNB combines signal energy for combining set 1 but fails to detect any RACH transmission.
9) In subframe 7:
a. MTC1 transmits its sixth repetition of preamble signature 5;
b. MTC2 transmits its fourth repetition of preamble signature 19;
c. The eNB combines signal energy but fails to detect any RACH transmission.
10) In subframe 8:
a. MTC1 transmits its seventh repetition of preamble signature 5;
b. MTC2 does not transmit any RACH since no resource is configured in this subframe for combining set 2;
c. The eNB combines signal energy for combining set 1 and successfully detects preamble signature 5. The eNB sends a Random Access Response to MTC1.
11) In subframe 9 & 10 no preamble signature is transmitted by MTC1 or MTC2. MTC1 has received its Random Access Response and hence stops its RACH preamble signature repetition. MTC2 does not have any resources configured for RACH preamble signature transmission.
12) In subframe 11, combining set 2'S periodic cycle restarts and MTC2 continues with its RACH transmission and transmits its 5th repetition of the first half of preamble signature 19. As in subframe 1, MTC2 sends only half of the preamble signature.
13) In subframe 12, MTC2 transmits the remaining half of its 5th repetition of preamble signature 19. The eNB still fails to detect any RACH transmission after combining signal energy from the previous combining set resources.
14) In subframe 13, MTC2 transmits its sixth repetition of preamble signature 19. This time, the eNB successfully detects preamble signature 19 and proceeds to send a Random Access Response. The RACH repetition for MTC2 therefore ends.

Accordingly, it can be seen that embodiments allow RACH coverage to be extended for MTC devices located poor coverage areas such as, for example, in basements. This approach does not require additional preamble signatures to be defined.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A wireless telecommunications network node method comprising:
   allocating resources of an uplink channel to different sets, wherein at least one set comprises a number of resource blocks within subframes of the uplink channel, and wherein resource blocks within a defined set are allocated for repeated transmission of RACH preamble signatures from a user equipment (UE) to the network, wherein different defined sets of groups of resource blocks are optimized for different conditions,
   indicating the allocated resources including the different defined sets from a base station to the UE,
   selecting, by the UE, one of the received defined sets based on conditions that the UE is experiencing,
   transmitting RACH preamble signature repetitions from the UE to the base station using resource blocks in the selected defined set.

2. The method of claim 1, wherein said repeated transmission comprises repeatedly transmitting an identical RACH preamble signature using a periodically repeating defined set of resource blocks of said uplink channel.

3. The method of claim 2, wherein said identical RACH preamble signature comprises a sequence of RACH preamble signatures and said step of repeatedly transmitting comprises repeatedly transmitting said sequence of RACH preamble signatures using said periodically repeating group of resource blocks within said periodically repeating selection of subframes.

4. The method of claim 1, wherein said periodically repeating defined set of resource blocks comprises a periodically repeating group of resource blocks within a periodically repeating selection of subframes of said uplink channel.

5. The method of claim 1, wherein said repeatedly transmitting comprises repeatedly transmitting said identical RACH preamble signature in at least one periodically repeating group of resource blocks within said periodically repeating selection of subframes.

6. The method of claim 1, comprising the receiving an indication of a plurality of said periodically repeating defined sets.

7. The method of claim 1, wherein at least one defined set comprises selected groups of resource blocks from selected sub-bands from selected subframes.

8. The method of claim 7, comprising the selecting, as said defined set, one of said plurality of defined sets having resource blocks within at least one sub-band.

9. The method of claim 1, wherein said at least one defined set includes at least one non-contiguous group of selected resource blocks at sub-band edges from selected sub-frames.

10. The method of claim 1, comprising the determining a sub-band of a strongest received pilot and selecting, as said defined set, one of said plurality of defined sets having resource blocks within said sub-band.

11. The method of claim 1, comprising the ceasing to transmit said RACH preamble signature when a random access response message is received.

12. A non-transitory computer-readable medium of a computer program product encoded thereon with instruction that when executed by a processor perform the method of claim 1.

13. The method of claim 1, wherein if the UE fails to access the network after a predefined number of attempts, selecting another set and transmitting RACH preamble signature repetitions from the UE to the base station using resource blocks in the selected other set.

14. The method of claim 1, wherein selecting, by the UE, one of the received defined sets is based on a strongest received pilot.

15. The method of claim 1, wherein the UE is a machine type communication (MTC) device and wherein the amount of RACH preamble signature repetitions to be transmitted is MTC device specific.

16. The method of claim 1, wherein the allocation comprises two types of sets of resources for RACH signaling: combining sets of resources and a non-combining set of resources, wherein the resources in the non-combining set can overlap with those in the combining set.

17. A base station for a wireless telecommunications network, wherein the base station comprises a processor configured to:
   indicate allocated resources to a user equipment (UE), wherein the allocated resources are resources of an uplink channel allocated to different sets, wherein at least one set comprises a number of resource blocks within subframes of the uplink channel, and wherein resource blocks within a defined set are allocated for repeated transmission of RACH preamble signatures from the UE to the network, wherein different defined sets of groups of resource blocks are optimized for different conditions,
   attempt to detect RACH preamble signature repetitions received from the UE using resource blocks in a defined set selected by the UE, and
   transmit a random access response message upon detection of the RACH preamble signature towards the UE.

18. The base station of claim 17, wherein the processor is further configured to:
   repeatedly combine transmitted signals received using a defined set of resource blocks of an uplink channel to detect a RACH preamble signature.

19. A user equipment (UE) for a wireless telecommunications network, wherein the UE comprises a processor configured to:
   receive an indication of allocated resources, wherein the allocated resources are resources of an uplink channel allocated to different sets, wherein at least one set comprises a number of resource blocks within subframes of the uplink channel, and wherein resource blocks within a defined set are allocated for repeated transmission of RACH preamble signatures from the UE to the network, wherein different defined sets of groups of resource blocks are optimized for different conditions,
   select one of the received defined sets based on conditions that the UE is experiencing,
   transmit RACH preamble signature repetitions from the UE towards a base station using resource blocks in the selected defined set.

20. The user equipment of claim 19, wherein the processor is further configured to:
   on a failure to establish a connection after initiating a RACH procedure, repeatedly transmit a RACH preamble signature using a defined set of resource blocks of an uplink channel to detect a RACH preamble signature.

21. The UE of claim 19, wherein selecting, by the UE, one of the received defined sets is based on a strongest received pilot.

22. The UE of claim 19, wherein the UE is a machine type communication (MTC) device and wherein the amount of RACH preamble signature repetitions to be transmitted is MTC device specific.

* * * * *